United States Patent [19]

Meyer

[11] Patent Number: 4,514,741

[45] Date of Patent: Apr. 30, 1985

[54] THERMAL INK JET PRINTER UTILIZING A PRINTHEAD RESISTOR HAVING A CENTRAL COLD SPOT

[75] Inventor: John D. Meyer, Mountain View, Calif.

[73] Assignee: Hewlett-Packard Company, Palo Alto, Calif.

[21] Appl. No.: 443,711

[22] Filed: Nov. 22, 1982

[51] Int. Cl.³ .............................................. G01D 15/16

[52] U.S. Cl. ................................ 346/140 R; 338/126

[58] Field of Search ................. 346/140 PD; 338/126, 338/127; 219/216 PH

[56] References Cited

U.S. PATENT DOCUMENTS 1,381,093 6/1921 Teegarden .......................... 338/126

OTHER PUBLICATIONS

*Condensed Chem Dictionary*, Hawley, 1977, p. 420.

*Primary Examiner*—Thomas H. Tarcza
*Assistant Examiner*—Mark Reinhart
*Attorney, Agent, or Firm*—Douglas A. Kundrat

[57] ABSTRACT

A thermal ink jet printer utilizes a printhead resistor which has a central conductive region to excite bubble growth and to cause ejection of ink droplets. The existence of the central conductive region causes bubbles to be created which are toroidal in shape and which fragment during collapse, thereby randomly distributing the resultant acoustic shock across the surface of the printhead resistor and minimizing cavitation damage.

16 Claims, 3 Drawing Figures

THERMAL INK JET PRINTER UTILIZING A PRINTHEAD RESISTOR HAVING A CENTRAL COLD SPOT

BACKGROUND AND SUMMARY OF THE INVENTION

Application of a current pulse to a thermal ink jet printer, as described for example in U.S. patent application Ser. No. 292,841, filed on Aug. 14, 1981 by Vaught et al, causes an ink droplet to be ejected by heating a resistor located within an ink supply. This resistive heating causes a bubble to form in the ink and the resultant pressure increase forces the desired ink droplet from the printhead. Thermal ink jet printer life time is dependent upon resistor life time and a majority of resistor failures result from cavitation damage which occurs during bubble collapse. In order to make multiple printhead, e.g., page width, arrays economically feasible, it is important that cavitation damage be minimized and that thermal jet ink jet printer life times exceed at least one billion droplet ejections.

In accordance with the illustrated preferred embodiment of the present invention, a thermal ink jet printer is shown in which cavitation damage is minimized and an extended life time is achieved. A printhead resistor is utilized which has a central conductive portion surrounded by a region of resistive material. Thus, a cold spot occurs in the center of the resistor when the current pulse is applied and a toroidal bubble is grown in the ink. During collapse, the bubble fragments into numerous smaller bubbles and the shock of the bubble collapse is randomly distributed across the resistor surface instead of being concentrated in a small central area.

DESCRIPTION OF THE PREFERRED EMBODIMENT

Figure 1:
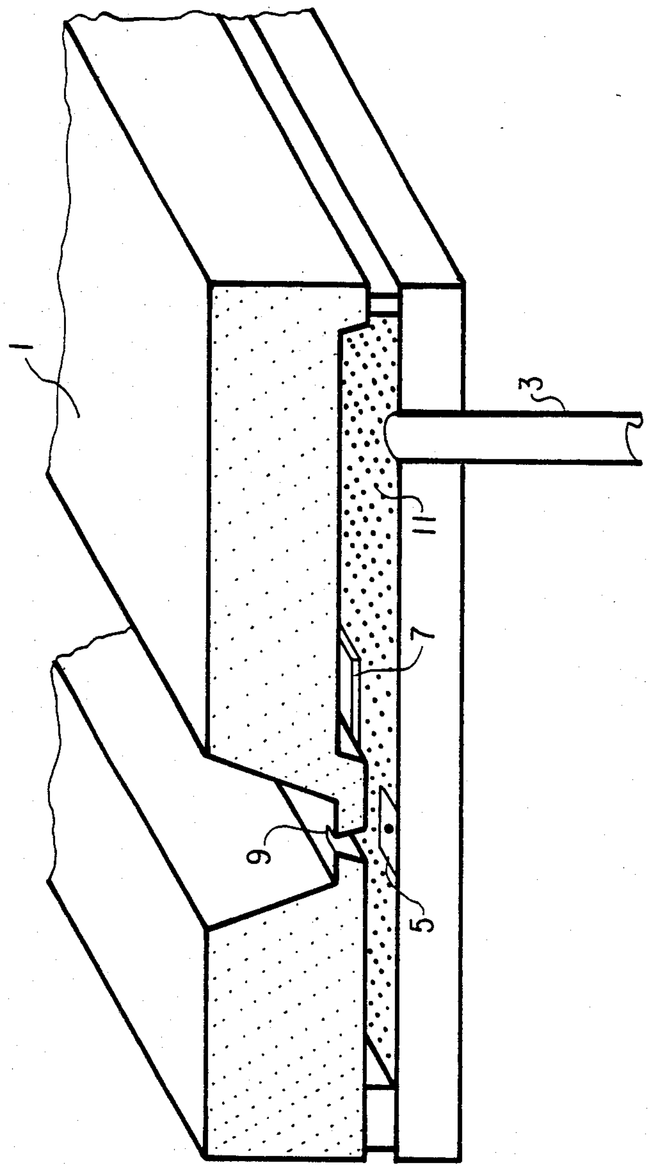
FIG. 1 is a diagram of a thermal ink jet printer which is constructed in accordance with the preferred embodiment of the present invention.

FIG. 1 is a diagram of a thermal ink jet printhead 1 which is constructed in accordance with the preferred embodiment of the present invention. Ink is received from a reservoir through a supply tube 3 and is supplied to a capillary region 11. When a current pulse is applied to resistor 5 (through conductors which are not shown), resistive heating causes a bubble to form in the ink overlying resistor 5 and an ink droplet is forced from nozzle 9. Multiple nozzles may be located on printhead 1 and barriers 7 are used to eliminate crosstalk between nozzles. The operation of printhead 1 is described in more detail in the above-discussed Vaught et al patent application which is incorporated herein by reference.

Figure 2:
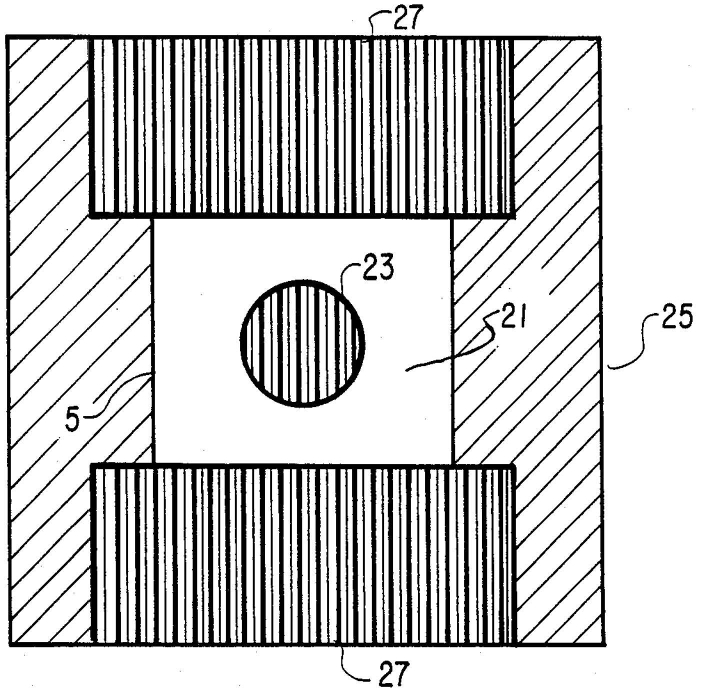
FIG. 2 is a diagram of a printhead resistor which is used in the thermal ink jet printer of FIG. 1.

FIG. 2 is a diagram of resistor 5 which is utilized in printhead 1. Resistor 5 comprises a conductive region 23 surrounded by a resistive region 21 both of which are fabricated upon a silicon substrate 25 with conventional thin film techniques. Conductors 27 are used to apply the current pulse to resistor 5. Resistive region 21 is an 80 micrometer square area of metallic glass (40% nickel, 40% tantalum, 20% tungsten) having a resistivity of 180–200 micro ohm-centimeter and a total resistance of approximately 4 ohms. Conductive region 23 is fabricated from a material having a resistivity which is much less than the resistivity of the material from which resistive region 21 is fabricated. In FIG. 2, conductive region 23 is a disk of gold film having a radius of 12 micrometers, a thickness of one micrometer, and a resistivity of 2.35 micro ohm-centimeter, which is sputtered onto the center of resistive region 21. Since the ratio of the resistivity of resistive region 21 to the resistivity of conductive region 23 is roughly 80:1, the effect of conductive region 23 is to electrically short the underlying portion of resistive region 21 and, thereby, to produce a cold spot in the center of resistor 5. It should be noted that the thermal diffusion length of conductive region 23 is about an order of magnitude greater than the thermal diffusion length of resistive region 21 for the current pulse lengths used. This means that the temperature of conductive region 23 can remain much cooler than resistive region 21 despite the IR heating of resistive region 21.

Figure 3:
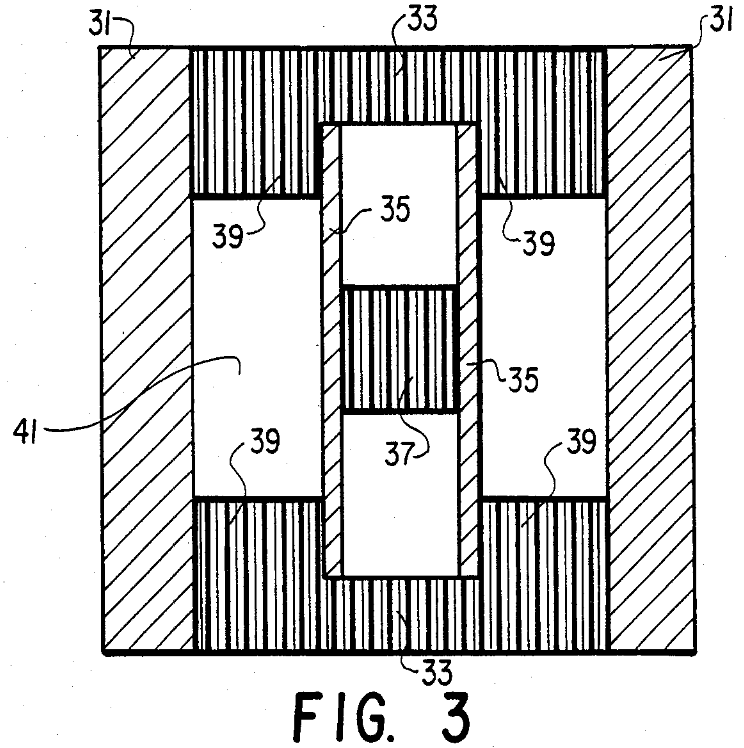
FIG. 3 is a diagram of a printhead resistor which is configured to avoid current crowding.

FIG. 3 is a diagram of another embodiment of resistor 5 in which current crowding problems are minimized. Resistor 5 is fabricated upon a substrate 31 utilizing well known thin film techniques using the same substrate, metallic glass, and gold components as are hereinabove described with reference to FIG. 2. Gold conductors 33 are used to permit the connection of a current pulse generator to the resistor. A 0.001 by 0.001 inch central conductive region 37 is bounded by two non-conductive strips 35 which are 5 micrometer wide areas of bare substrate. Four 0.001 inch wide by 0.0005 inch high conductive regions 39 are coupled to conductors 33. Four resistive regions 41 are arranged around central conductive region 37 in a checkerboard fashion.

The total resistance of the resistor shown in FIG. 3 is 2.67 ohms and the resistance of each of the three vertical current paths is 8 ohms with the result that current crowding is eliminated. When the current pulse (a 0.82 ampere pulse was used) is applied, vapor growth commences over each of resistive regions 41. The separate bubbles merge into a single, toroidal, bubble as desired as the individual bubbles grow.

The performance of resistor 5 shown in FIG. 2 was tested with water and a 2 microsecond, 1 ampere, current pulse and cavitation damage was observed to be minimized. When the current pulse was applied to resistor 5, nucleation and initial bubble growth commenced in a normal fashion but, the bubble that was created was toroidal in shape because of the absence of vapor generation over conductive region 23. When the bubble collapsed, it was observed to fragment into four or more smaller bubbles which were randomly distributed across the surface of resistor 5.

I claim:

1. A thermal ink jet printer, responsive to a control signal, for ejecting an ink droplet from a capillary region, the thermal ink jet printer comprising a printhead resistor in thermal contact with the capillary region for receiving the control signal, the printhead resistor being composed of a resistive region and a conductive region located within said resistive region and electrically connected thereto.

2. A thermal ink jet printer as in claim 1, wherein the resistivity of the conductive region is less than the resistivity of the resistive region.

3. A thermal ink jet printer as in claim 2, wherein the conductive region is located at substantially the geometric center of the resistive region.

4. A thermal ink jet printer as in claim 3, wherein the conductive region is substantially circular.

5. A thermal ink jet printer as in claim 4, wherein the conductive region comprises gold film.

6. A thermal ink jet printer, responsive to a control signal, for ejecting an ink droplet from a capillary region, the thermal ink jet printer comprising a printhead resistor in thermal contact with the capillary region for receiving the control signal, the printhead resistor comprising:

first, second and third current paths electrically connected in parallel;

a first insulator attached between the first and second current paths;

a second insulator attached between the second and third current paths;

the first and third current paths each comprising a central resistive region and upper and lower conductive regions connected thereto; and the second current path comprising a central conductive region and upper and lower resistive regions connected thereto.

7. A printhead resistor as in claim 6, wherein the resistances of the first, second, and third current paths are substantially equal.

8. A printhead resistor as in claim 7, wherein the central conductive region of the second current path is substantially equidistant from the upper and lower conductive regions of the first and third current paths.

9. A printhead resistor as in claim 8, wherein the resistivity of the conductive regions is less than the resistivity of the resistive regions.

10. A printhead resistor as in claim 9, wherein the conductive regions comprise gold film.

11. A thermal ink jet printer as in claim 1, wherein the capillary region is substantially filled with ink.

12. A thermal ink jet printer as in claim 4, wherein the capillary region is substantially filled with ink.

13. A thermal ink jet printer as in claim 6, wherein the capillary region is substantially filled with ink.

14. A thermal ink jet printer as in claim 7, wherein the capillary region is substantially filled with ink.

15. A thermal ink jet printer as in claim 8, wherein the capillary region is substantially filled with ink.

16. A thermal ink jet printer as in claim 9, wherein the capillary region is substantially filled with ink.

* * * * *